3,009,881
METHOD OF STABILIZING POLYPHENYL COOLANTS
John G. Burr, Tarzana, and Jack D. Strong, Canoga Park, Calif., assignors, by mesne assignments, to the United States of America as represented by the United States Atomic Energy Commission
No Drawing. Filed Nov. 17, 1959, Ser. No. 853,470
3 Claims. (Cl. 252—73)

Our invention relates to a method of stabilizing organic coolants, and more particularly to a method of inhibiting radiolytic and pyrolytic damage to polyphenyl compounds under nuclear irradiation.

Polyphenyl compounds have been long used as industrial heat transfer agents. Polyphenyls are now also enjoying use as nuclear power reactor coolants and/or moderators. Polyphenyls are in many ways ideally suited for such service in nuclear reactors due to their excellent moderating capacity, low vapor pressure at elevated temperatures, which eliminates need for pressure vessels, and their compatibility with ordinary materials of construction such as carbon steel. Although polyphenyls are among the most stable of organic compounds, they tend to progressively decompose under the effects of heat and nuclear radiations. The decomposition products are many and complex, and include compounds with molecular weights both lower and higher than of the original polyphenyl compound. Gases are formed, and also higher polymers, for instance hexaphenyl and beyond.

The organic coolant tends to become progressively more viscous with polymer formation, and with continued exposure, decrease of heat transfer coefficients, increased pumping power requirements, and possibly fouling of heat transfer surfaces result. In the organic moderator reactors this tendency toward degradation of the fluid after prolonged exposure to radiation and heat is controlled by bleeding off a portion of the coolant, and purifying it by distillation. In the distillation the undamaged polyphenyl is separated from polymers and lighter fractions, and is then returned to the reactor together with fresh organic make-up fluid. While such purification and make-up permits the organic reactor to operate satisfactorily without adverse effects, an extra cost factor is added. At present, the cost of organic make-up is equivalent to approximately 1 mil per kilowatt hour. This is rather significant when it is noted that average power costs from conventional power sources in the United States are about 6 mils per kilowatt hour, and that the cost of hydroelectric power is about 4 mils per kilowatt hour. It can be readily appreciated, therefore, that decreasing the rate of polyphenyl breakdown in organic moderated reactors could achieve considerable cost savings, improve the operation of the reactor, and make a significant contribution to the development of economical nuclear power from this type of reactor.

An object of our present invention, therefore, is to provide a method of protecting polyphenyls from breakdown under the effects of heat and nuclear radiations.

Another object of our invention is to provide a method of stabilizing an organic reactor coolant.

Still another object is to provide an improved organic reactor coolant composition.

Yet another object is to provide an improved, economical method of decreasing the decomposition rate of polyphenyl coolant undergoing nuclear irradiation.

A further object is to provide an improved polyphenyl reactor coolant composition containing a relatively small amount of a radiation damage inhibitor.

Other objects and advantages of our invention will become apparent from the following detailed description.

In accordance with our present invention we have provided a method of inhibiting radiolytic damage to a polyphenyl under nuclear irradiation, which comprises adding a small amount of an aromatic ketone to said polyphenyl. We have found, for example, that adding a few percent of an aromatic ketone to polyphenyl will reduce the hydrogen gas formation and polymer yield in the coolant (measures of polyphenyl decomposition) by as much as about 66%. Aromatic ketone additives are not expensive, are perfectly compatible with the polyphenyl coolant, and have no deleterious effects upon the reactor system or its components.

The polyphenyls now in general use in organic moderated reactors are polyphenyl hydrocarbons containing approximately 2 to 4 phenyl rings, without side-chain substitutions. Diphenyl and terphenyl and its isomers (ortho, meta, para), and mixtures of diphenyl and terphenyl are most widely used. By the term "polymer," we intend to designate polyphenyls containing at least five phenyl groups, such polymers being too viscous to be of practical use in a reactor and requiring removal by distillation. The organic moderated reactors are now maintained by distillation at an equilibrium polymer or high boiler residue concentration of about 30%.

We have discovered that the degradation of polyphenyls may be inhibited by adding to the polyphenyl composition a relatively few percent of an aromatic ketone, which we define to be aromatic compound having at least one benzenoid ring and at least one carbonyl grouping attached to the benzenoid ring. The aromatic ketones which may be used in our invention may be suitably divided into four general sub-generic groupings: benzophenones, para-benzoquinones, ortho-benzoquinones, and benzils; vat dyes of the indanthrene group such as violanthrene may also be used. Side-chain substituents may be made to these compounds, although it is generally preferred to employ non-substituted compounds. The substituted members can be fused rings, aryl groups, alkyl groups, oxygen-containing groups such as OH, COOH, CHO and their derivatives, and non-carbon-containing groups such as halogen, $NO_2$, $NH_2$, and $SO_2H$. Any substituent would generally be aryl groups or fused ring groups, since the non-cyclic substituents tend to be less radiation stable. Furthermore, we prefer the aromatic ketone be composed only of hydrocarbons, with the exception, of course, of the carbonyl group.

The following table is offered as an example of specific aromatic ketone compounds which may satisfactorily be used in our invention as polyphenyl radiation inhibitors.

TABLE

Benzophenones:
    Benzophenone
    Phenyl 4-biphenyl ketone
    Phenyl-α-naphthyl ketone
    Di-α-napthyl ketone
    Di-terphenyl ketone
    Fluorenone Para-benzoquinones:
    Para-benzoquinone
    Tetraphenyl-para-benzoquinone
    1,4-napthaquinone
    Anthraquinone
    1-phenylanthraquinone Ortho-benzoquinones:
    Ortho-benzoquinone
    1,2-benzanthraquinone
    Phenylbenzanthraquinone
    7,8-chrysoquinone
    1,2-pyrenequinone
    1,2-naphthaquinone
    9,10-phenanthraquinone Benzils:
- Benzil
- Phenyl benzil
- Phenyl-α-napthyldiketone
- Di biphenyl diketone
- Di-α-naphthyl diketone The percentage additions of our aromatic ketones to the polyphenyl coolant may be satisfactorily varied over a considerable range with very satisfactory results, and no particular percentage is critical. Factors of economics, and degree of inhibition required, will be considered in selecting the exact percentage. However, we find that approximately 1–10 mole percent of the additive is suitable, while about 5 mole percent is optimum. The aromatic inhibitor compound may be added directly to the polyphenyl composition without use of any solvents or pretreatments. Solubility of the aromatic ketones is complete in liquid polyphenyls.

The following examples are offered to illustrate our invention in greater detail.

The irradiations described in the examples below were carried out in a Cobalt-60 (gamma) source with the organic mixture in the liquid state, which was accomplished by heating the mixture to about 90° C. and holding it at this temperature during the course of the irradiation. The samples were contained within a Pyrex glass bulb. The sample was degased on a high vacuum line using the conventional "freeze-melt" technique. For gas measurements, the irradiated ampule was broken in a high vacuum where the products were put through a liquid nitrogen trap. The non-condensable gases at this temperature ($-196°$ C.) were collected and measured, and then the gases were analyzed for composition in a mass spectrometer. Total sample weight before irradiations was approximately 8 grams. The Cobalt-60 source intensity was approximately $1.4 \times 10^{18}$ electron volts per minute per milliliter of water. Irradiation time was about 48 hours.

*Example I*

Five mole percent of benzophenone was added to biphenyl and the irradiation procedure outlined above was followed. The gas evolution was $4.9 \times 10^{-3}$ molecules/100 e.v., as compared with $7.8 \times 10^{-3}$ molecules/100 e.v. for a biphenyl control sample.

*Example II*

Six mole percent of benzophenone was added to terphenyl. The gas evolution rate was $5.2 \times 10^{-3}$ molecules/100 e.v., as compared with $6.6 \times 10^{-3}$ molecules/100 e.v. of a terphenyl control sample.

*Example III*

Three mole percent para-benzoquinone was added to a 20% biphenyl–80% terphenyl mixture. The resulting polymer yield was 75% of the control.

*Example IV*

Nine mole percent ortho-benzoquinone was added to biphenyl. The resulting gas evolution was $3.7 \times 10^{-3}$ molecules/100 e.v., as compared with $7.8 \times 10^{-3}$ molecules/100 e.v. for the biphenyl control.

*Example V*

Two mole percent ortho-benzoquinone was added to an ortho, meta, para-isomeric mixture of terphenyls. The resulting gas evolution was $3.9 \times 10^{-3}$ molecules/100 e.v., as compared with a gas evolution of $4.5 \times 10^{-3}$ molecules/100 e.v. for the terphenyl mixture without the additive.

*Example VI*

Seven mole percent benzil was added to biphenyl. The resulting gas evolution was 63% of the control sample.

*Example VII*

Four mole percent 1-phenylbenzil was added to terphenyl and irradiated. This resulted in a polymer yield 78% of the control sample.

*Example VIII*

Two mole percent of di-terphenyl ketone was added to a 50–50 mixture of biphenyl and terphenyl. The resulting gas evolution was 83% of the control sample.

*Example IX*

Ten mole percent of anthraquinone was added to biphenyl, and the relative polymer yield was 40% that of biphenyl without the additive.

*Example X*

About 5 mole percent of benzanthracene-7,12-dione was added to a 20 mole percent biphenyl–80 mole percent terphenyl mixture, and the relative gas formation compared to ordinary diphenyl was 74%.

*Example XI*

One mole percent benzoylpyridine was added to diphenyl and the relative polymer yield was 92%.

The above examples are only illustrative rather than restrictive of our invention. Accordingly, our invention should be understood to be limited only as indicated in the appended claims.

Having thus described our invention, we claim:

1. A method of inhibiting radiolytic damage to a polyphenyl coolant composition undergoing nuclear irradiation, said polyphenyl composition initially consisting essentially of polyphenyls having 2–4 phenyl rings, which comprises adding to said composition approximately 1–10 mole percent of an aromatic ketone selected from the group consisting of benzophenones, para-benzoquinones, ortho-benzoquinones, and benzils.

2. A method of inhibiting radiolytic damage to a polyphenyl composition undergoing nuclear irradiation, said polyphenyl composition initially consisting essentially of polyphenyls having 2–4 phenyl rings, which comprises adding approximately 5 mole percent benzophenone to said polyphenyl composition.

3. A method of inhibiting radiolytic damage to a polyphenyl composition undergoing nuclear irradiation, said polyphenyl composition initially consisting essentially of polyphenyls having 2–4 phenyl rings, which comprises adding approximately 5 mole percent anthraquinone to said polyphenyl composition.

References Cited in the file of this patent

UNITED STATES PATENTS 2,925,448     Colichman _____ Feb. 16, 1960

FOREIGN PATENTS 652,282     Great Britain _____ Apr. 18, 1951